United States Patent [19]
Burkhardt

[11] Patent Number: 4,558,780
[45] Date of Patent: Dec. 17, 1985

[54] CONVEYER APPARATUS

[76] Inventor: Volker Burkhardt, Lerchenstrasse 29, 7085 Bopfingen, Fed. Rep. of Germany

[21] Appl. No.: 554,004

[22] Filed: Nov. 21, 1983

[30] Foreign Application Priority Data

Dec. 30, 1982 [DE] Fed. Rep. of Germany ....... 3248597

[51] Int. Cl.$^4$ ............................................. B65G 13/02
[52] U.S. Cl. ..................................... 198/780; 198/789
[58] Field of Search ............... 198/789, 790, 791, 780; 193/37; 384/418, 419, 434, 441, 439, 384, 546, 587, 903

[56] References Cited

U.S. PATENT DOCUMENTS

| 1,288,828 | 12/1918 | Kiefer ................... 384/419 |
| 1,508,454 | 9/1924 | Knapp ................... 384/419 |
| 1,865,038 | 6/1932 | Oldham ................ 384/434 |
| 2,973,093 | 5/1956 | Erickson ........... 198/789 X |
| 2,983,352 | 5/1961 | De Flora et al. ........ 384/419 X |
| 3,382,015 | 5/1968 | Steidl ............... 384/441 X |

FOREIGN PATENT DOCUMENTS 2658157  6/1978  Fed. Rep. of Germany ...... 384/903

Primary Examiner—Joseph E. Valenza
Assistant Examiner—Michael Stone
Attorney, Agent, or Firm—Walter H. Schneider

[57] ABSTRACT

An arrangement for conveying of materials on conveyer rollers is disclosed in which the rollers are arranged sequentially one behind the other and the ends are supported in bearings in carrying brackets. The roller shafts are driven, each roller shaft is furnished with a torque transmitter, and the roller shafts are prevented from axial shifting by way of the bearings. At least one carrying bracket is divided, into two parts, at the horizontal central plane of the roller shaft bearing, thereby providing an upper part and a lower part. Dishlike recesses are arranged in the upper part and the lower part, at a distance to one another and in sequence one behind the other, with each recess serving to receive a pertaining roller-shaft bearing. Between a pertaining pair of recesses, which are arranged one behind the other, in at least one carrying bracket there is arranged at the parting plane a longitudinal slot which extends into the pertaining recess, and into the longitudinal slot there extends a means for securing the journals, which means is adapted to be effectively connected to the outer circumference of each pertaining roller-shaft bearing. The securing means is preferably provided by a sheet metal strip which extends with one end into a groove in the outer circumference of the pertaining roller-shaft bearing.

2 Claims, 2 Drawing Figures

CONVEYER APPARATUS

BACKGROUND OF THE INVENTION

1. Field of the Invention

The present invention relates generally to improvements in or relating to conveyers. More particularly, the present invention is concerned with an apparatus for transporting of materials on conveyer rollers, which rollers are arranged sequentially one behind the other when viewed in the direction of travel, and are secured with their respective ends in carrying brackets. The roller shafts are driven, equipped with torque transmitter means, and secured against axial shifting by means of bearings.

Conveyers with conveyer rollers are known. These generally comprise carrying brackets or support arms which are arranged at the pertaining ends of the rollers, such that the roller shafts with the corresponding rollers are arranged between such carrying brackets.

Such conveyers with rollers are furnished either with a positive, or direct, drive, or they are powered by means of a drive which acts through the intervention of friction. The conveying is carried out thereby exclusively through the friction-value which is the result of the individual values of the pertaining components. The transport of the material to be conveyed, accordingly, is only carried out when the path, or travel, is free of obstacles. According to the present state in the art this is achieved thereby that the conveyer rollers are connected only by way of frictional contact to the roller shafts, i.e. they can freely rotate, as required, with respect to the pertaining roller shafts. The roller shafts, in turn, are fixedly secured to a drive unit, which usually includes sprocket wheels which are laterally arranged with respect to a carrying bracket. The driving motion can be transmitted from roller to roller by short chains, whereby on each roller there have to be arranged two sprockets, one alongside the other. Alternatively, the driving motion or force may be transmitted by a continuous chain. On the other hand, the driving force may also be imparted by belts, or other similar means.

2. Description of the Prior Art

The prior art carrying brackets heretofore have been mono-component brackets. The roller shafts are arranged with both ends in the pertaining carrying brackets, particularly in ball bearings which are furnished with a groove, and whereby the roller shafts are secured against axial shifting, by means of retaining rings which are arranged laterally outside of each carrying bracket and at each pertaining ball bearing.

The prior art conveyer briefly described in the foregoing has the disadvantage that it cannot readily be assembled, and the operation is only problem-free when all, or nearly all, individual components are produced with utmost precision.

For the assembly initially there have to be pressed into place in a carrying bracket, for example, into that which is directed towards the drive side, the grooved ball bearing. Subsequently, the roller shafts are inserted into the ball bearings. The conveyer rollers are mounted onto the roller shafts, and the free ends of the roller shafts are subsequently inserted into the pertaining ball bearing of the carrying bracket on the other side. This method of assembly is, accordingly, time-consuming and laborious. This applies equally to the disassembly of the prior art conveyer in the case where defective parts have to be replaced.

The further disadvantage of the prior art conveyer resides therein that the mounting in bearings and the retention of both ends of the roller shafts are carried out in grooved ring journals each of which journal, for axially securing the roller shafts, is secured, by way of retainer rings arranged laterally alongside and outside of the two carrying brackets, in the groove of a roller bearing. The recesses to the left and right in the axis of the roller shaft, for retention of the pertaining retainer rings, had to be precisely dimensioned and provided with appropriate play, because otherwise such roller would have axial play, which, in turn, would lead to detrimental repercussions in the case where the driving force is transmitted by frictional contact. In the case when such recesses will be arranged to the left and right at the outer circumference of the roller shaft in a direction too far to the interior or center, in an offset manner, then it would have been positioned in the grooved ring bearing, with the consequence that the retainer ring could not operatively register or be connected.

SUMMARY OF THE INVENTION

There has continued to remain, therefore, a need for improving the conveyer apparatus briefly described in the foregoing.

It is an object of the invention to provide a conveyer for the transport of materials on conveyer rollers, which conveyer is adapted to allow a fast and simple assembly, and disassembly, of the roller shaft.

It is also an object of the invention to provide simple means for preventing axial shifting of the roller shafts in the carrying brackets.

These various objects are met in accordance with the present invention thereby that at least one carrying bracket is divided, at the horizontal central plane of the roller-shaft bearing, or journal, into an upper part and a lower part.

In accordance with another aspect of the invention there are provided, respectively, in the lower part and in the upper part, at a distance from one another, and one behind the other when viewed in the direction of travel, dish-like shaped recesses, apertures, or other similar receiving openings, for the retention of the roller-shaft bearings.

In accordance with a further aspect of the invention between respectively two, sequentially arranged apertures or recesses, arranged one behind the other, there is provided in at least one carrying bracket part, in the separation plane, a longitudinal slot or groove which extends into a pertaining recess or recesses.

In accordance with another aspect of the invention into the longitudinal slot there is inserted a means for retaining the bearing, in its position, which means is operatively connectable to the outer circumference of the roller-shaft bearing.

The division of the carrying bracket or support arm into two parts allows the separation of the upper part from the lower part. Since the division into two components is carried out at the horizontal central plane of the roller-shaft bearing, or bearings, respectively, the recesses for receiving the bearings are separated in a dishlike, or a semi-circular manner. In this way, a fully preassembled roller shaft can simply be inserted into the carrying bracket, without the need that the bearings have to be pressed into the recesses, as is the teaching of the prior art, whereupon the individual roller shafts have to be moved therethrough. Furthermore, in an advantageous manner between two recesses, arranged serially one behind the other, in at least one of the carrying bracket parts, at the separation plane, there can be arranged a longitudinal groove or slot, or similar keyhole, which extends into the pertaining recess which receives the bearing. Into the longitudinal slot there is inserted the means for retaining or securing the pertaining bearing. This means is operatively connectable to the outer circumference, or the outer bearing ring respectively, of the roller-shaft bearing and, in this way, secures the entire roller shaft against axial shifting.

In accordance with a preferred embodiment of the invention, the means for securing the bearing can be a retaining member of which one end extends into a groove in the outer circumference, or ring respectively, of the roller-shaft bearing. In this manner, there is achieved a simple, yet effective, arrangement to prevent axial shifting or movement of the roller shafts. The retaining member can be provided by a sheet metal strip, which represents a relatively simple and economical material of construction.

The means for securing the bearing, or the bearing retaining-strip respectively, can be arranged, in the case of driven roller shafts, in the divided carrying bracket on that side thereof on which the pertaining drive is arranged, while on the other side, the side which is not driven, the roller shaft is mounted in a bearing which is not fixed in place.

In accordance with one aspect of the invention this is possible thereby that the sheet metal strip, which serves as the retaining member for the bearing, is operatively connectable to the bearing, by being inserted in a circumferential groove in the outer ring of a ball bearing, for example, thereby preventing the axial movement of the journal or bearing. This configuration reduces the production effort because there will be no need for two special and expensive bearings for each roller shaft, but, in accordance with the invention, on one side there can be used a relatively cheap bearing which is not fixed in position.

In accordance with a further embodiment of the invention, the longitudinal slot extends over the full distance between two recesses which are arranged one behind the other when viewed in the direction of travel, whereby the pertaining two ends of the retaining member, or sheet metal strip, extend, respectively, into a groove which is provided in the outer circumference, i.e. in the outer wall of the pertaining ring of the bearing for the roller shaft. Such a longitudinal groove can be arranged either in the lower part or in the upper part, whereby two grooves would be arranged in alignment one above the other, so that the retaining member for securing the bearings is inserted into the pair of longitudinal grooves or slots.

In this manner there is achieved a lateral arresting in place of the upper part and the lower part, which together comprise the carrying bracket. Furthermore, there is achieved the effect that the retaining member, or sheet metal strip, is securely and optimally operatively connected into the groove of the roller-shaft bearing, at the parting plane.

In accordance with yet another embodiment of the invention the two parts of the carrying bracket are joined together by screws, or similar threaded fasteners, or other fasteners as may be relevant for the situation at hand. Between two recesses, or receiving openings, which are arranged one behind the other when viewed in the direction of travel, there is provided in the upper part of the carrying bracket, at least one bore which penetrates fully through the upper part, and this bore is in alignment with a corresponding threaded bore in the lower part of the carrying bracket. In this manner, there can be secured, or inserted, a screw into both bores, which screw will effect a secure connection of the two parts with respect to one another. The bearings, which in accordance with a preferred embodiment comprise ball bearings, are thus force-lockingly secured or retained. The load-carrying capacity of a carrying bracket which is assembled from two parts, as has been described in foregoing, is generally the same as that of a carrying bracket which is of mono-component structure.

The apparatus in accordance with the present invention allows a rapid assembly and disassembly of the conveyer rollers.

The disassembly for maintenance purposes, such as replacement of defective rollers by new roller shafts, is substantially simplified and carried out much faster. The rollers can be fully preassembled, to include the pertaining sprocket wheel, or alternatively a frictioned wheel or worm wheel, the pertaining shaft, and a ball bearing with a groove in the outer ring which will serve as fixed bearing on that side which accommodates the drive arrangement, as well as being preassembled with a plain ball bearing without a groove, on the other side of the assembly, which bearing would be not fixed in position, and further being preassembled with two conveyer rollers in accordance with the pertaining embodiment of such rollers. It is also advantageous that now there is required only one ball bearing having a groove instead of the customary two ball bearings, each furnished with a groove in the pertaining outer ring, for each roller, while nevertheless there is provided full prevention of, or securement against, axial shifting. The rollers are mounted in bearings in a defined manner whereby there is provided, on that side of the apparatus which accommodates the drive, a bearing which is arranged to be in fixed position, while on the other side, which does not accommodate the drive, the bearing is not retained in a fixed manner, whereby larger tolerances of the shaft-length are possible without the loss of accuracy.

Since the two parts of the carrying bracket are fastened, respectively, between two rolls, to one another by screws, the carrying capacity or capability of this carrying bracket is almost of the same magnitude as that of a carrying bracket which is of mono-component structure.

It is, of course, within the scope of the present invention that only on one side of the carrying bracket is provided by a divided bracket and that on the other side of the apparatus that is use made of a mono-component structure.

Instead of a ball bearing having a groove in the outer ring there could be also be used a standard ball bearing which is furnished with a small recess or cut-in which is provided in the outer circumference, i.e. in the outer wall of the pertaining race ring of such ball bearing. The two latter-mentioned variations represent a reduction of the production costs.

It will be obvious that the carrying bracket in accordance with this invention can be used in all conveying equipment making use of rollers, for example, conveyers using friction rollers, or conveyers which use continuously conveying rollers.

Further embodiments of the invention and other inventive features are contained in the claims.

DESCRIPTION OF THE DRAWINGS

In the drawings, which illustrate that which is presently regarded as the best mode of carrying out the invention.

DESCRIPTION OF THE PREFERRED EMBODIMENTS

Figure 1:
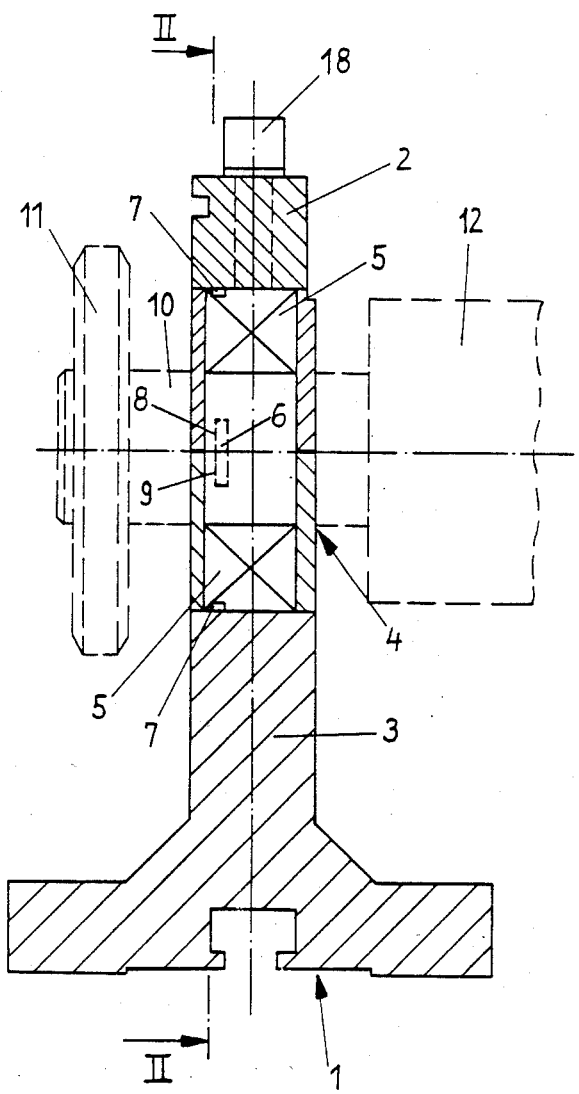
FIG. 1 is a cross-sectional view of a carrying bracket in accordance with one embodiment of the invention, with the cross-section being taken along I—I in FIG. 2.
Figure 2:
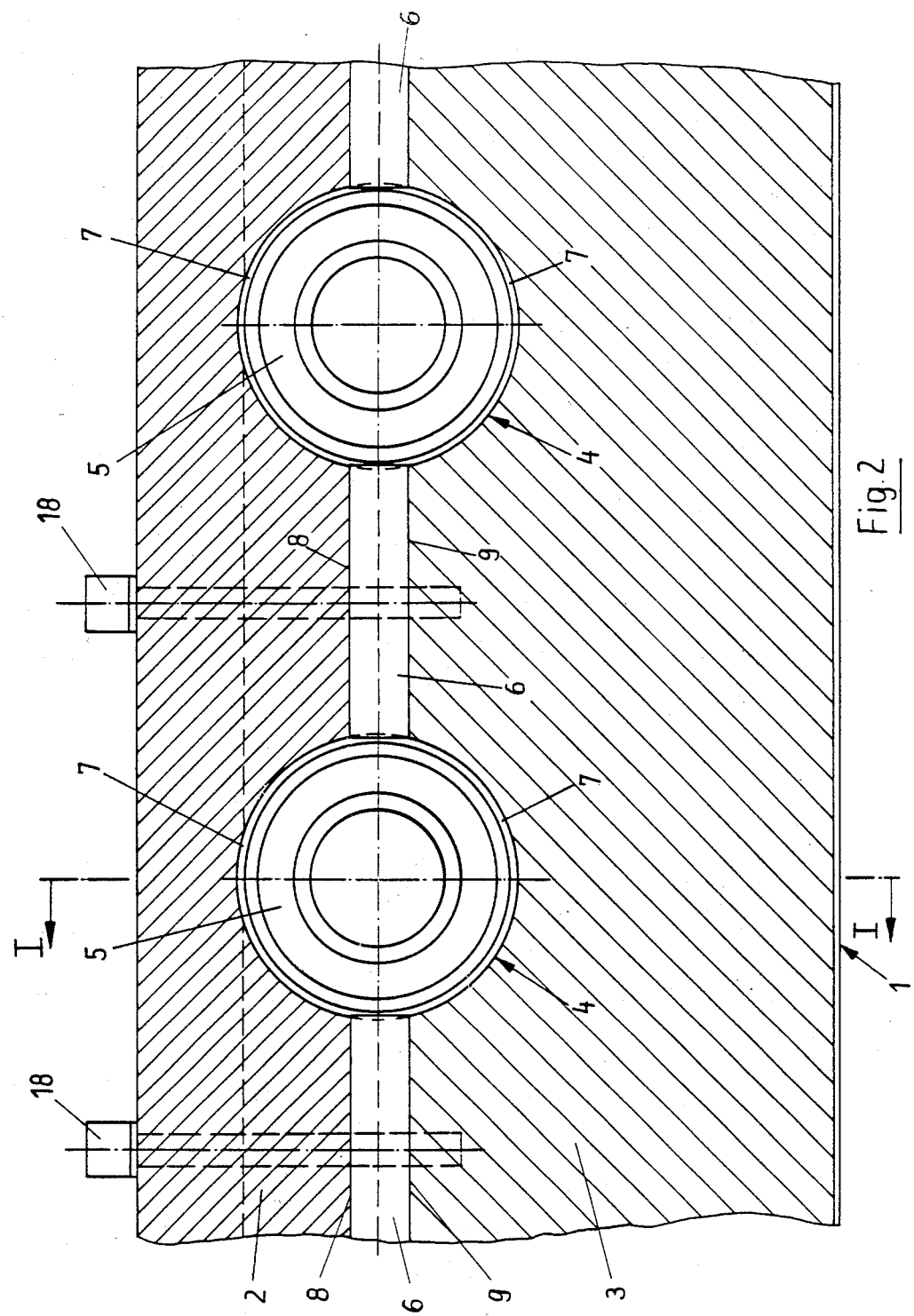
FIG. 2 is a longitudinal section along line II—II of FIG. 1.

A carrying bracket or support arm, or similar member, 1 is provided by a first, or upper, part 2, and a lower, second, part 3. In the lower part 3 and the upper part 2 are arranged recesses, receiving openings, apertures, or similar openings which are generally of semi-circular or dish-like configuration, which are arranged in serial arrangement, one behind the other along the carrying bracket, when viewed in the direction of travel of the conveyer.

Roller-shaft bearings, for example, ball bearings or similar antifriction bearings, designated by reference numeral 5, can be positioned in the recesses 4. Between two roller-shaft bearings 5, arranged one behind the other with respect to one another, there are vertically introduced retaining members, or sheet metal strips 6, which are operatively connectable in those grooves 7 which are arranged about the outer circumference of the roller-shaft bearing 5.

In the upper part 2 and the lower part 3 there are respectively arranged receiving means such as grooves or longitudinal slots. Slots 8 are provided in the upper part 2, and for the lower part 3 there are provided longitudinal slots or grooves 9, with each superimposed pair of these forming a unitary full-groove. Into this full-groove there is inserted the retaining member or strip 6. The groove (8, 9) extends over the full length between two recesses 4. The retaining member 6 corresponds in its length to the distance between grooves 7 of two corresponding roller-shaft bearings 5.

Between each pair of recesses 4 there are provided, in each of the two carrying brackets, vertically aligned through bores and threaded bores for receiving therein screws 18 which serve to connect the pertaining upper part 2 with the corresponding lower part 3 in a form-locking manner For assembly of the rollers there are initially removed the screws 18. Subsequent to this, the upper part 2 is removed from the lower part 3. Now the completely preassembled roller shafts 10 can be placed into the semicircular recesses 4. One only has to observe that the ball bearings 5, which are furnished with grooves, are arranged on that side of the assembly which also accommodates the pertaining drive arrangement. Between the two corresponding ball bearings 5 which are furnished with a groove, there is subsequently introduced into the pertaining groove 9 of the lower part 3, in perpendicular manner, respectively one retaining member, or sheet metal strip 6. In doing this it is to be observed that the vertical ends of each retaining member 6 engage, or are introduced, in exact manner into the groove 7 of the pertaining ball bearing 5 having a circumferential groove. After all roller shafts 10 and all retaining members 6 have been put in place, the upper part 2 is positioned on top of the corresponding lower part 3, in such a way that each ball bearing 5 having a circumferential groove comes to rest in its pertaining semi-circular recess 4. The screws 18 are then reintroduced and secured. This concludes the final assembly. In the same simple manner the disassembly is carried out when, for example, as required, defective rollers have to be replaced.

To further illustrate the invention, the roller shaft 10 is shown in dash outline in FIG. 1. On the shaft 10 there is arranged at the left-hand end a means for transmitting torque, designated by the reference numeral 11, which torque transmitter is also outlined in dash lines. On the other side of the carrying bracket 1 there is shown, also in dash outline, a conveyer roller 12, which is operatively connected to the roller shaft 10.

It is also within the scope of the present invention that aside from the configuration of the carrying bracket 1 shown in the drawings there can also be used shapes which, when viewed in cross-section, present I- or U-sections, or similar configurations. It is only required that in at least one vertical section, or in the case of a U-section which would include two vertical sections, then in at least two vertical sections, there is provided a separation into an upper part and a lower part, with the plane of separation being provided at the central plane of the roller-shaft bearing 5.

Reference in this disclosure to details of the specific embodiments is not intended to restrict the scope of the appended claims, which themselves recite those features regarded as essential to the invention.

I claim:

1. An apparatus for transporting material comprising first and second longitudinally extending, spaced conveyor supports, the first of which comprises upper and lower sections divided along a horizontal plane; a plurality of conveyor assemblies extending between said conveyor supports each of which comprises a roller shaft having a large diameter conveyor roller afixed between its ends and a roller shaft bearing afixed adjacent each of its ends, each of said conveyor assemblies being adapted to rotate and to be inserted and removed from said apparatus as a unit; circular bearing recesses in each conveyor support for receiving the roller shaft bearings of each conveyor assembly, each circular bearing recess in said first conveyor support being formed by cooperating semi-circular recesses in each of said upper and lower sections thereof; longitudinal semi-grooves in the divided surface of each of said upper and lower sections of said first conveyor support extending between and communicating with each semi-circular recess, said semi-grooves forming full grooves adapted to receive retaining members when said upper and lower sections are brought together; a recess in the circumference of each roller shaft bearing received in each of the bearing recesses of said first conveyor support adapted to receive one end of a retaining member, each adjacent pair of bearing recesses receiving an opposite end of the retaining member when received by the full groove, whereby lateral movement of said roller shaft is minimized; and a vertical bore extending through said upper section and into said lower section between each bearing recess of said first conveyor support adapted to receive securing means, whereby said upper and lower sections can be brought together by the insertion of said securing means into said bore thereby permitting said bearing recesses to receive and support said roller shaft bearings, and can be separated by the withdrawal of said securing means thereby permitting the removal of said roller shaft bearings from said bearing recesses and said conveyor assemblies from the apparatus.

2. An apparatus according to claim 1 in which torque transmitting means are associated with each conveyor assembly adjacent the first conveyor support.

* * * * *